Jan. 2, 1968 B. WEINGARTNER 3,361,876

HIGH FREQUENCY CIRCUIT ARRANGEMENT FOR CAPACITIVE TRANSDUCER

Filed May 18, 1964

INVENTOR.
BERNHARD WEINGARTNER
BY
Frank R. Jifari
AGENT 3,361,876

HIGH FREQUENCY CIRCUIT ARRANGEMENT FOR CAPACITIVE TRANSDUCER

Bernhard Weingartner, Vienna, Austria, assignor to Akustische u. Kino-Gerate Gesellschaft m.b.H., Vienna, Austria, a firm Filed May 18, 1964, Ser. No. 368,245
Claims priority, application Austria, May 20, 1963, A 4,071/63
6 Claims. (Cl. 179—1)

ABSTRACT OF THE DISCLOSURE

A high frequency electrostatic microphone circuit comprises a transformer having a center tapped secondary winding connected in circuit with a capacitor microphone and a fixed capacitor to form a bridge circuit. The transformer primary winding is connected to the output of a high frequency oscillator. An inductor is connected between the second center tap and the junction of the microphone and capacitor. A first demodulating network is coupled to the bridge circuit to produce a modulated signal including a component of noise voltage. A second demodulating circuit is coupled to the oscillator output to produce an unmodulated signal including a component of noise voltage also. The two signals are combined so that the noise voltages cancel and a resultant modulated voltage having a high signal-to-noise ratio is derived.

Figure 1:
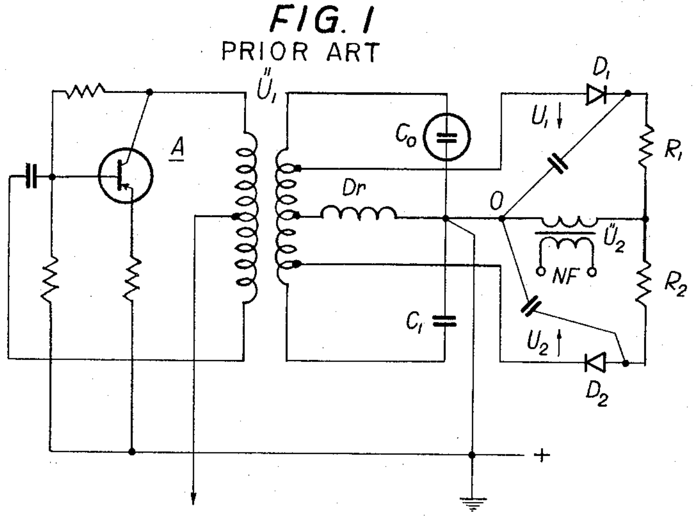
FIG. 1 PRIOR ART

This invention relates to a circuit arrangement for electro-acoustic transducers of the electrostatic type, particularly condenser microphones.

The known transducer circuit arrangements may be divided into two groups. In one group, the capacitive transducer is given a predetermined, constant, electric charge, and variations in capacitance caused by the diaphragm movements result in variations of the voltage developed across an operating resistor. These variations in voltage are proportional to the movement of the diaphragm. This circuit arrangement is widely used and is referred to as an audiofrequency circuit.

The difficulties involved in this group of circuit arrangements are due to the fact that operating resistors having a very high resistance must be used because the capacitance of the microphone is very small. This gives rise to insulation problems and requires means to oppose the inconvenient phenomena which are due to the high resistance of the control circuits (grid circuits of electronic tubes).

In the other group of circuit arrangements for condenser microphones, the movement of the diaphragm results in a variation of the capacitance of the transducer, and this variation is transformed into an at least approximately proportional variation of a parameter, e.g., the amplitude, phase or frequency of an auxiliary oscillation signal of high frequency. For this reason, these circuit arrangements are generally referred to as high frequency circuits.

One of the best known circuit arrangements of this kind is the Riegger circuit, in which the variation of the capacitance of the condenser microphone results in a frequency modulation of the high-frequency auxiliary oscillation. When this oscillation is then demodulated by any of the known circuits, an audiofrequency voltage is obtained which corresponds to the signal of the transducer.

In another high frequency circuit, the amplitude of the high frequency oscillation voltage is varied in synchronism with the variations of the capacitance of the transducer. This arrangement results in an amplitude-type modulation including only side band components but no carrier component. The carrier then must be reinserted in the detector stage in proper phase. This can only be done by means of special circuits.

In another high-frequency circuit which has been disclosed, a condenser microphone is included in one arm of a bridge and connected in series with a capacitor forming the adoining arm of the bridge. In this case, the high frequency voltage is applied by means of a transformer, the secondary winding of which consists of two symmetrical halves, which form the two opposite arms of the bridge. The alternating voltage having an audiofrequency modulation is derived from the diagonal of the bridge by means of an audiofrequency transformer, which lies in the diagonal of a diode bridge circuit. The direct current path for this bridge diagonal is closed by a high frequency choke in a diagonal of high frequency bridge.

The main disadvantage of this circuit arrangement is its low sensitivity. The modulation of the high frequency oscillations caused by the variations of the capacitance of the condenser microphone when exposed to sound is very small so that interfering modulations and the inherent noise of the demodulating circuit result in an unsatisfactory signal-to-noise ratio.

It is an object of the invention to eliminate noise to a large extent in such a high frequency circuit arrangement for condenser microphones. According to the invention, this is achieved by adding to the bridge circuit containing the microphone a second bridge circuit, which is analogous to the first bridge circuit, but which receives only the unmodulated oscillator signal plus the inevitable component of noise voltage. The output of the second bridge circuit is combined with the output of the main bridge circuit and serves to compensate the noise voltage appearing at the output of the bridge circuit containing the microphone.

In other words, the invention relates to a high frequency circuit arrangement comprising an oscillator, a supply transformer having a primary winding connected to the output of said oscillator, a secondary winding having a center tap dividing said secondary winding into two secondary winding sections, and an inductance element having one end connected to said center tap. The circuit also includes a capacitive transducer and a capacitor which are connected in series across the secondary winding. The other end of said inductance element is connected to the junction of said transducer and capacitor. A first demodulating network is coupled to said secondary winding and to said other end of said inductance element, so that said first demodulating network is responsive to the output of said oscillator as modulated by said capacitive transducer. The invention teaches to provide a second demodulating network, which is arranged to be responsive to the output of said oscillator free from modulation introduced by said capacitive transducer, and to combine the outputs of said demodulating networks in opposition to each other to provide a mutual compensation of noise introduced by both demodulating networks.

Figure 2:
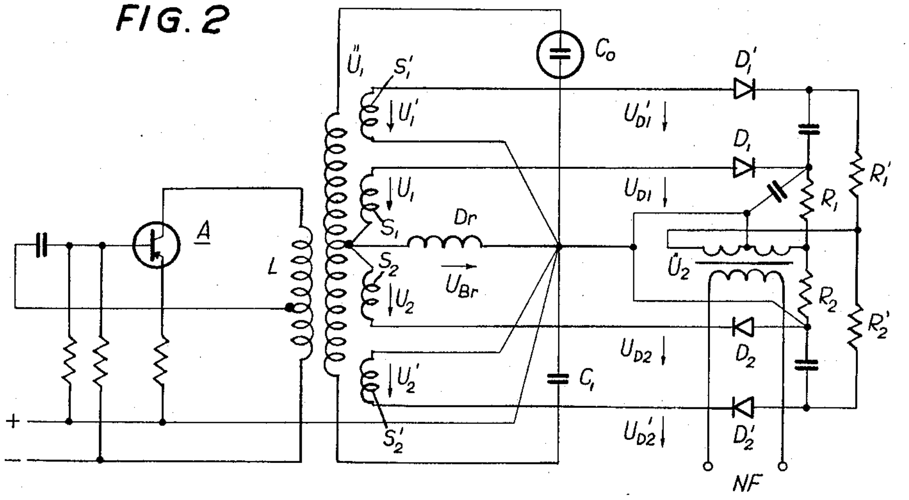

The invention will now be explained more fully with reference to the accompanying drawing, in which FIG. 1 shows a prior art circuit arrangement on which the invention is based and FIG. 2 schematically illustrates a preferred embodiment of the invention.

In the known bridge circuit shown in FIG. 1, the circuit A designates a transistor oscillator having, e.g. a frequency between 500 and 2000 kilocycles per second. The oscillation frequency of this oscillator is essentially determined by the inductance of the high frequency transformer Ü$_1$ and the two series-connected capacitances $C_0$ and $C_1$. $C_0$ is the capacitance of the condenser microphone and $C_1$ a capacitance having approximately the same value. When both capacitances have the same value, the high frequency voltages $U_1$ and $U_2$ applied to the two diodes $D_1$ and $D_2$ have also the same value so that the demodulated noise voltages modulating the amplitude of the high frequency oscillations are compensated for a major part at the audiofrequency transformer $U_2$. In practical operation, however, the two capacitances $C_0$ and $C_1$ are never preferably equal and there are also stray couplings which cannot be controlled. As a result, a residual noise voltage remains at the transformer $\ddot{U}_2$ which is also effective at the output. It is an object of the invention to improve the ratio of the signal to this noise by an increase in sensitivity.

The circuit operates as follows: If the condenser microphone is exposed to sound, this will result in a change of its capacitance $C_0$ and of the voltage ratio $U_1+U_2$ whereas the sum of the two voltages $U_1+U_2$ at the secondary windings $S_1$ and $S_2$ remains constant. These secondary windings will be referred to hereinafter. Demodulation results then at the primary winding of the transformer $\ddot{U}_2$ in the appearance of a differential voltage, which is proportional to the variation of the value of the capacitance $C_0$ and constitutes the audiofrequency voltage which can be utilized.

FIG. 2 shows the high frequency circuit arrangement provided according to the invention for condenser microphones in a development of the circuit arrangement described herein before.

The basic circuit according to the invention (FIG. 2) corresponds substantially to the arrangement according to FIG. 1, with the difference that the diodes $D_1$ and $D_2$ are transformer-coupled by special windings $S_1$, $S_2$ of the high frequency transformer $\ddot{U}_1$ to the voltage generator A so that an optimum matching can be achieved. The bridge voltage $U_{Br}$ is added to the voltages $U_1$ and $U_2$ induced in these windings. As is known from the ratio detector, demodulation is effected with the audiofrequency transformer $\ddot{U}_2$ as an operating resistor and the resistor $R_1$, $R_2$ as unidirectional resistances.

According to the invention, the transformer $\ddot{U}_1$ is further provided, for compensating the noise voltage, with two secondary windings $S_1'$ and $S_2'$. The electrical center of windings $S_1'$ and $S_2'$ is at the alternating-current zero voltage point so that only the oscillator voltage ($U_1'$, $U_2'$) which is modulated by the noise is induced in them. This voltage is rectified in the diodes $D_1'$ and $D_2'$ and is fed as a low-frequency noise voltage to another winding of the transformer $\ddot{U}_2$. By a suitable selection of the transmission ratios of the transformers and, if desired, by an additional inclusion of resistors in the circuit, the effect of this noise voltage on the output of the arrangement is adjusted approximately to the same value as the noise voltage which comes from the bridge circuit proper and appears without modulation at the first winding of the transformer $\ddot{U}_2$. Because the voltages are applied to the transformer $\ddot{U}_2$ in such a manner that their effects virtually cancel each other, the no-signal noise can be almost perfectly compensated so that the signal-to-noise ratio can be further improved.

To ensure that the charateristic curves of the diodes are as nearly equal as possible, it may be suitable to connect resistors, which may be adjustable, in series with the diodes.

Instead of the condenser microphone, another capacitive transducer may be used as a modulating member in the circuit. Examples of such transducers are capacitive-type pressure responsive signal generators, microphones responsive to sound conducted through solids, extensometers, etc.

What is claimed is:

1. A high frequency circuit arrangement comprising an oscillator for generating a high frequency signal, a supply transformer having a primary winding connected to the output of said oscillator and a secondary winding having a center tap dividing said secondary winding into two secondary winding sections, an inductance element having one end connected to said center tap, a capacitive transducer and a capacitor connected in series across said secondary winding, means connecting the other end of said inductance element to the junction of said transducer and said capacitor, a first demodulating network coupled to said secondary winding and to said other end of said inductance element and responsive to the output signal of said oscillator as modulated by said capacitive transducer to produce a first modulated signal including a component of noise voltage, a second demodulating network, including means coupled to the output of said oscillator and responsive to the unmodulated output of said oscillator to produce a second unmodulated signal including a component of noise voltage and means combining the outputs of said first and second demodulating networks in opposition to each other to provide a mutual compensation of the noise voltages introduced by said demodulating networks.

2. A high frequency circuit arrangement as set forth in claim 1, in which said first demodulating network comprises two winding sections inductively coupled to said secondary winding and connected to said center tap, and said second demodulating network comprises two other winding sections inductively coupled to said secondary winding and connected to the other end of said inductance element.

3. A high frequency circuit arrangement as set forth in claim 1, in which said capacitive transducer is a condenser microphone.

4. A circuit as described in claim 1 wherein said combining means comprises a transformer having a primary winding comprising first and second winding sections having a common junction and a secondary winding, said first and second signals being applied to said first and second winding sections in a sense to cause said components of noise voltage in each of said signals to substantially neutralize each other.

5. A high frequency circuit comprising, an oscillator for generating a high frequency signal, a transformer having a primary winding connected to the oscillator output and a secondary winding having two equal winding sections with a common junction, a fixed capacitor, a bridge circuit wherein said two winding sections comprise first and second arms of the bridge and said capacitor comprises a third arm of the bridge, a capacitive transducer connected in the fourth arm of the bridge in series with said capacitor so as to modulate the high frequency signal of said oscillator in accordance with the modulating input to the transducer, an inductor connected between said common winding junction and the junction of said third and fourth bridge arms, a first demodulating network coupled to said secondary winding to produce a first signal modulated in accordance with the transducer modulation and having a component of noise voltage, neutralizing means for said noise voltage comprising a second demodulating network coupled to the output of said oscillator so as to produce a second unmodulated signal having a component of noise voltage similar to that of said first signal, and means for combining said first and second signals in series opposition so that said components of noise voltage substantially cancel one another.

6. A circuit as described in claim 5 wherein said transformer further comprises another pair of equal secondary winding sections having a common junction and connected to said second demodulating network.

References Cited

UNITED STATES PATENTS 3,310,628 3/1967 Cragg ---------------- 179—1

KATHLEEN H. CLAFFY, *Primary Examiner.*

R. P. TAYLOR, *Assistant Examiner.*